United States Patent
Yoshihiro

(10) Patent No.: US 7,574,100 B2
(45) Date of Patent: Aug. 11, 2009

(54) INFORMATION SIGNAL RECORDING APPARATUS AND METHOD FOR COMPRESSION-ENCODING VIDEO DATA

(75) Inventor: Toshitaka Yoshihiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 620 days.

(21) Appl. No.: 11/079,498

(22) Filed: Mar. 14, 2005

(65) Prior Publication Data
US 2005/0207735 A1    Sep. 22, 2005

(30) Foreign Application Priority Data
Mar. 15, 2004    (JP) .............................. 2004-072179

(51) Int. Cl.
*H04N 5/76* (2006.01)
(52) U.S. Cl. .......................................... 386/34; 386/69
(58) Field of Classification Search .................... 386/1, 386/33, 34, 69; 348/386.1
See application file for complete search history.

(56) References Cited

U.S. PATENT DOCUMENTS 5,218,563 A * 6/1993 Juri et al. .................... 708/551
5,673,065 A * 9/1997 DeLeeuw .................... 345/605
6,122,400 A   9/2000 Reitmeier
6,219,381 B1  4/2001 Sawada et al.

FOREIGN PATENT DOCUMENTS

| EP | 0 688 134 | 12/1995 |
| EP | 1 185 099 | 3/2002 |
| JP | 3734020   | 10/2002 |

OTHER PUBLICATIONS

Min Suk Hong et al: "Adaptive Bit Allocation Coder For DVCR Trick Play" Consumer Electronics, 1992. Digest of Technical Papers. ICCE., IEEE 1992 International Conference on Rosemont, IL, USA Jun. 2-4, 1992, New York, NY, USA,IEEE, US, Jun. 2, 1992, pp. 110-111, XP010102972 ISBN: 0-7803-0479-9.

* cited by examiner

*Primary Examiner*—David E Harvey
(74) *Attorney, Agent, or Firm*—Frommer Lawrence & Haug LLP; William S. Frommer; Thomas F. Presson

(57) ABSTRACT

An information signal recording apparatus for compression-encoding video data comprising a search picture generating block AND a color signal compensating block. The search picture generating block decreases the bit length of a component of a luminance signal and the bit length of a component of a color signal of an intra-coded data of the compression-encoded video data to generate search picture data, and the color signal level compensating block compensates the signal level of part or all the color signal for one frame so that the signal level increases.

9 Claims, 9 Drawing Sheets

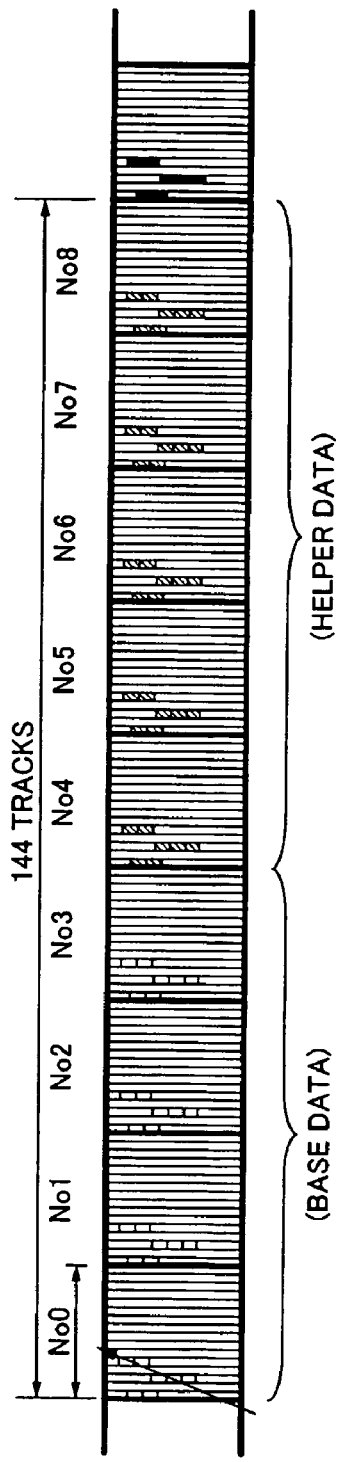

Fig. 4A

144 TRACKS

No0, No1, No2, No3, No4, No5, No6, No7, No8

(BASE DATA)  (HELPER DATA)

Fig. 4B

* STRUCTURE OF 1 MACRO BLOCK

Y0:6BITS, Cb:5BITS, Cr:BIT = 16BITS

* NUMBER OF MACRO BLOCKS CONTAINED IN 1 SYNC BLOCK
  45MB (=720BITS/16BITS)

* 34 SYNC BLOCKS CAN BE OBTAINED EVERY TRACE (1 ECC UNIT)

45MB × 34SB × 4SCAN = 6120 MB

Fig. 4C

* STRUCTURE OF 1 MACRO BLOCK

Y1:6BITS, Y2:6BITS, Y3:6BITS = 18BITS

* NUMBER OF MACRO BLOCKS CONTAINED IN 1 SYNC BLOCK
  40MB (=720BITS/18BITS)

* 34 SYNC BLOCKS CAN BE OBTAINED EVERY TRACE (1 ECC UNIT)

40MB × 34SB × 5SCAN = 6800 MB

Fig. 6

| PACKET HEADER | CONTENTS | L/H | REMARKS |
|---|---|---|---|
| 0 | SH | L | SEARCH HEADER |
| 1 | SH | H | SEARCH HEADER |
| 2 | TTC | L | ↑ CONTENTS OF SUB CODE |
| 3 | TTC | H | |
| 4 | REC TIME | L | |
| 5 | REC TIME | H | |
| 6 | REC DATE | L | |
| 7 | REC DATE | H | |
| 8 | ATN+FLG | L | |
| 9 | ATN+FLG | H | ↓ |
| 10 | ETN | L | |
| 11 | ETN | H | |
| 12 | BINARY GP | L | |
| 13 | BINARY GP | H | |
| 14 | PART NO. | L | (FOR RECORDED TAPE) |
| 15 | PART NO. | H | (FOR RECORDED TAPE) |
| 16 | CHAPTER START | L | (FOR RECORDED TAPE) |
| 17 | CHAPTER START | H | (FOR RECORDED TAPE) |
| 18~31 | RESERVED | | RESERVED |

INFORMATION SIGNAL RECORDING APPARATUS AND METHOD FOR COMPRESSION-ENCODING VIDEO DATA

BACKGROUND OF THE INVENTION

1. Field of the Invention

The present invention relates to an information signal recording apparatus, an information signal recording method, an information signal reproducing apparatus, and an information signal reproducing method.

2. Description of the Related Art

Recording and reproducing apparatuses corresponding to the digital video (DV) format for recording and reproducing a digital video signal, for example a camcorder (which is a general product name derived from camera and recorder), have been widespread. The following Patent Document 1 describes an apparatus that records and reproduces, by using a tape and a rotating head unit that are the same as those of a DV format camcorder, high definition (HD) data that have been compressed in accordance with MP@H-14 prescribed in the Moving Picture Experts Group Phase 2 (MPEG2) system. The contents described in Patent Document 1 are referred to as the HDV2 standard.

[Patent Document 1] Japanese Patent Laid-Open Publication No. 2002-314941

The patent document 1 describes a technology for forming search picture data with I pictures, causing intervals of intraframes used as search data constant, and decreasing the data amount of high speed search pictures. The MPEG2 system uses intra-coded pictures (I pictures), predictive-coded pictures (P pictures), and bidirectionally predictive-coded pictures (B pictures) in accordance with different encoding systems.

An I picture is a picture of which, when it is encoded, only information thereof is used. Thus, an I picture can be decoded without need to use other information. When a search operation is performed, since the path of a rotating head does not match a track formed on a tape, only a fragment of data is reproduced. Thus, it is necessary to form search pictures with I pictures.

A P picture is a picture that uses an I picture or a P picture that has been decoded chronologically before the current P picture as a predictive picture (a reference picture for obtaining the difference between two pictures). The difference between the current P picture and a predictive picture that has been motion-compensated is encoded. Alternatively, the current P picture is encoded. One of the two methods is selected in the unit of a macro block so that a higher effect can be obtained.

A B picture is a picture that uses three types of pictures that are an I picture or a P picture that has been decoded chronologically before the current B picture, an I picture or a P picture that has been decoded chronologically after the current B picture, and an interpolated picture formed with the foregoing two types of pictures, as a predictive picture (a reference picture for obtaining the difference between two pictures). Based on the three types of reference pictures that have been motion-compensated the differences are encoded. Alternatively, the three types of pictures are intra-encoded. One of these methods is selected in the unit of a macro block so that a higher effect can be obtained.

Thus, there are four types of macro blocks that are an intra-frame coded macro block of which a current macro block is encoded in a frame, a forward inter-frame macro block of which a future macro block is predicted with a past macro block, a backward inter-frame predictive macro block of which a past macro block is predicted with a future macro block, and a bidirectional macro block of which a current macro block is predicted from both the forward and backward directions. A P picture contains an intra-frame coded macro block and a forward inter-frame predictive macro block. A B picture contains all the four types of macro blocks.

In Patent Document 1, to decrease the data amount of search pictures, DC components are extracted from discrete cosine transform (DCT) blocks of a luminance signal and color difference signals and the number of bits of each of the extracted DC components is decreased from the original 8 bits to 6 bits (for each of DC components of the luminance signal) and 5 bits (for each of DC components of the color difference signals).

Since the number of bits that are decreased is large, from 8 bits to 5 bits, the possibility that small color difference data is truncated to 0 is high. Video data photographed by for example a video camera contains many portions that have low signal levels. Depending on a picture pattern, most of a picture on a screen may be truncated to 0. As a result, search pictures may be formed as colorless pictures. Search pictures can be coarse pictures. However, if search pictures are colorless, the user may feel uncomfortable or mistake them for a trouble of the apparatus.

OBJECTS AND SUMMARY OF THE INVENTION

Therefore, an object of the present invention is to provide an information signal recording apparatus, an information signal recording method, an information signal reproducing apparatus, and an information signal reproducing method that prevent search pictures of which the number of bits of color data is decreased for compressing the data amount of the search pictures from becoming colorless.

To solve the foregoing problems, a first aspect of the present invention is an information signal recording apparatus for compression-encoding video data and recording the compression-encoded video data onto a recording medium, the information signal recording apparatus comprising:

a search picture generating block configured to decrease the bit length of a component of a luminance signal and the bit length of a component of a color signal of an intra-coded data of the compression-encoded video data so as to generate search picture data;

a color signal compensating block configured to compensate the component of the color signal processed by the search picture generating block so as to increase the level of the component of the color signal; and a recording block configured to dispersedly record the search picture data generated by the search picture generating block onto the recording block.

A second aspect of the present invention is an information signal reproducing apparatus for reproducing data from a recording medium on which compression-encoded video data has been recorded and search picture data and search data information have been dispersedly recorded, the search picture data having been generated by decreasing the bit length of a component of a luminance signal and the bit length of a component of a color signal of intra-coded data of the compression-encoded video data, the search picture data having been generated by compensating the component of the color signal so as to increase the level of the component of the color component, the search data information representing the amount of increase of the level increased by a color signal compensating block, the information signal reproducing apparatus comprising:

a reproducing block configured to reproduce the compression-encoded video data from the recording medium when a normal reproducing operation is performed and reproduce the search data information and the search picture data from the recording medium when a search reproducing operation is performed;

a decompression-decoding block configured to decode a reproduction picture from the reproduced compression-encoded picture data; and a search picture decoding block configured to decode the search picture from the search picture data with the reproduced search data information.

A third aspect of the present invention is an information signal recording method for compression-encoding video data and recording the compression-encoded video data onto a recording medium, the information signal recording method comprising the steps of:

decreasing the bit length of a component of a luminance signal and the bit length of a component of a color signal of an intra-coded data of the compression-encoded video data so as to generate search picture data;

compensating the component of the color signal processed at the search picture generating step so as to increase the level of the component of the color signal; and dispersedly recording the search picture data generated at the search picture generating step onto the recording block.

A fourth aspect of the present invention is an information signal reproducing method for reproducing data from a recording medium on which compression-encoded video data has been recorded and search picture data and search data information have been dispersedly recorded, the search picture data having been generated by decreasing the bit length of a component of a luminance signal and the bit length of a component of a color signal of intra-coded data of the compression-encoded video data, the search picture data having been generated by compensating the component of the color signal so as to increase the level of the component of the color component, the search data information representing the amount of increase of the level increased by a color signal compensating block, the information signal reproducing method comprising the steps of:

reproducing the compression-encoded video data from the recording medium when a normal reproducing operation is performed and reproducing the search data information and the search picture data from the recording medium when a search reproducing operation is performed;

decoding a reproduction picture from the reproduced compression-encoded picture data; and decoding the search picture from the search picture data with the reproduced search data information.

According to the present invention, before search data is generated, color data is processed. As a result, the problem that search pictures become colorless can be solved.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawing, wherein similar reference numerals denote similar elements, in which:

FIG. 4A, FIG. 4B, and FIG. 4C are schematic diagrams describing the arrangement of search picture data on a tape at eight-times high speed.

FIG. 6 is a schematic diagram describing packet data of a search sync block.

DETAILED DESCRIPTION OF THE PREFERRED EMBODIMENT

Figure 1:
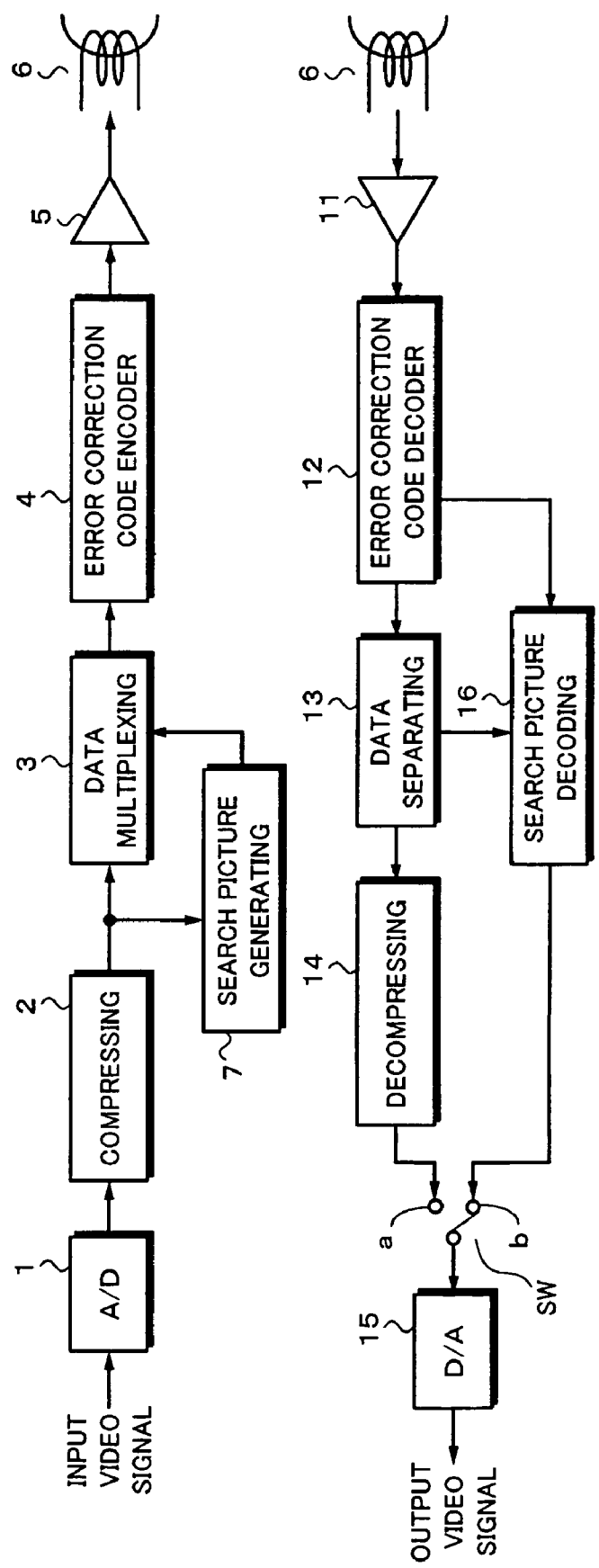
FIG. 1 is a block diagram showing a recording system and a reproducing system of a digital VCR according to the present invention.

Next, with reference to the accompanying drawings, an embodiment of the present invention will be described. FIG. 1 shows an outlined structure of a section that mainly processes a video signal of a digital VCR according to the present invention. An input video signal is supplied to an A/D converter 1. The A/D converter 1 converts the input video signal into a digital video signal. The digital video signal is supplied to a compressing block 2. The compressing block 2 compresses the digital video signal in accordance with MP@H-14 of the MPEG2 system. The compressed video data (packetized elementary stream: PES) is output from the compressing block 2 to a data multiplexing block 3.

The data multiplexing block 3 multiplexes the compressed video data, compressed audio data, system data, search picture data, and so forth. Output data of the data multiplexing block 3 is supplied to an error correction code encoder 4. The error correction code encoder 4 encodes the output data of the data multiplexing block 3 with an error correction code. The encoded data is supplied to a rotating head 6 through a recording amplifier 5. Inclined tracks are successively formed on a tape wound around the periphery of the rotating drum having a pair of rotating heads disposed thereon so that they are opposite to each other with an angle of for example 180°.

The video data that has been compressed by the compressing block 2 are supplied to a search picture generating block 7. The search picture generating block 7 generates search picture data with the compressed video data. The generated search picture data is supplied to the data multiplexing block 3. The data multiplexing block 3 multiplexes the search picture data with record data.

Reproduction data that is reproduced from the tape by the rotating head 6 are supplied to an error correction code decoder 12 through a reproducing amplifier 11. The error correction code decoder 12 corrects an error of the reproduction data. In addition, the error correction code decoder 12 detects a synchronous signal, an ID, and so forth. The reproduction data that is output from the error correction code decoder 12 are supplied to a data separating block 13.

The data separating block 13 separates the reproduction data into compressed video data, compressed audio data, reproduction search picture data, system data, and so forth from the reproduction data. The compressed video data separated by the data separating block 13 is supplied to a decompressing block 14. The decompressing block 14 decompresses the compressed video data and obtains base band reproduction video data. The reproduction video data is supplied to a terminal a of a switch SW. When the normal reproduction operation is performed, the reproduction video data is supplied to a D/A converter 15 through the switch SW. The D/A converter 15 obtains an analog output video signal.

The reproduction search picture data is supplied to a search picture decoding block 16 through the error correction code decoder 12. The search data information is supplied from the data separating block 13 to the search picture decoding block 16. The reproduction search picture data decoded by the search picture decoding block 16 are supplied to a terminal b of the switch SW. When the search operation is performed, the search picture signal, which is an analog video signal, converted by the D/A converter 15 is obtained as an output video signal through the terminal b of the switch SW.

Figure 2:
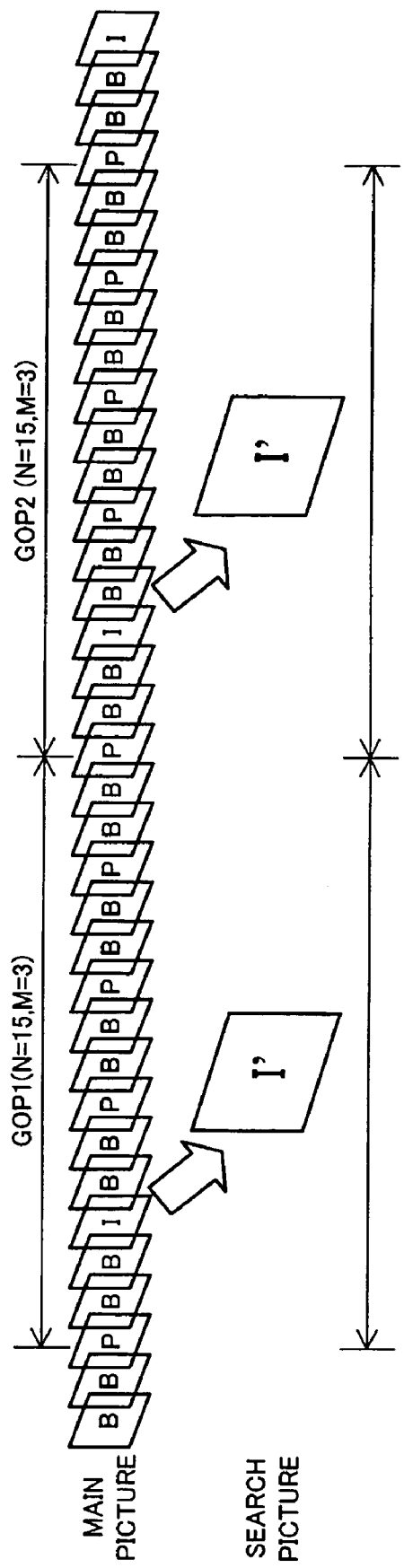
FIG. 2 is a schematic diagram describing the structure of the time base of search picture data.

FIG. 2 shows a compressing process performed by the compressing block 2 for video data. The compressing block 2 compresses frames in the unit of one GOP (group of pictures) (GOP 1, GOP 2, and so forth). One GOP is composed of 15 frames.

Figure 3:
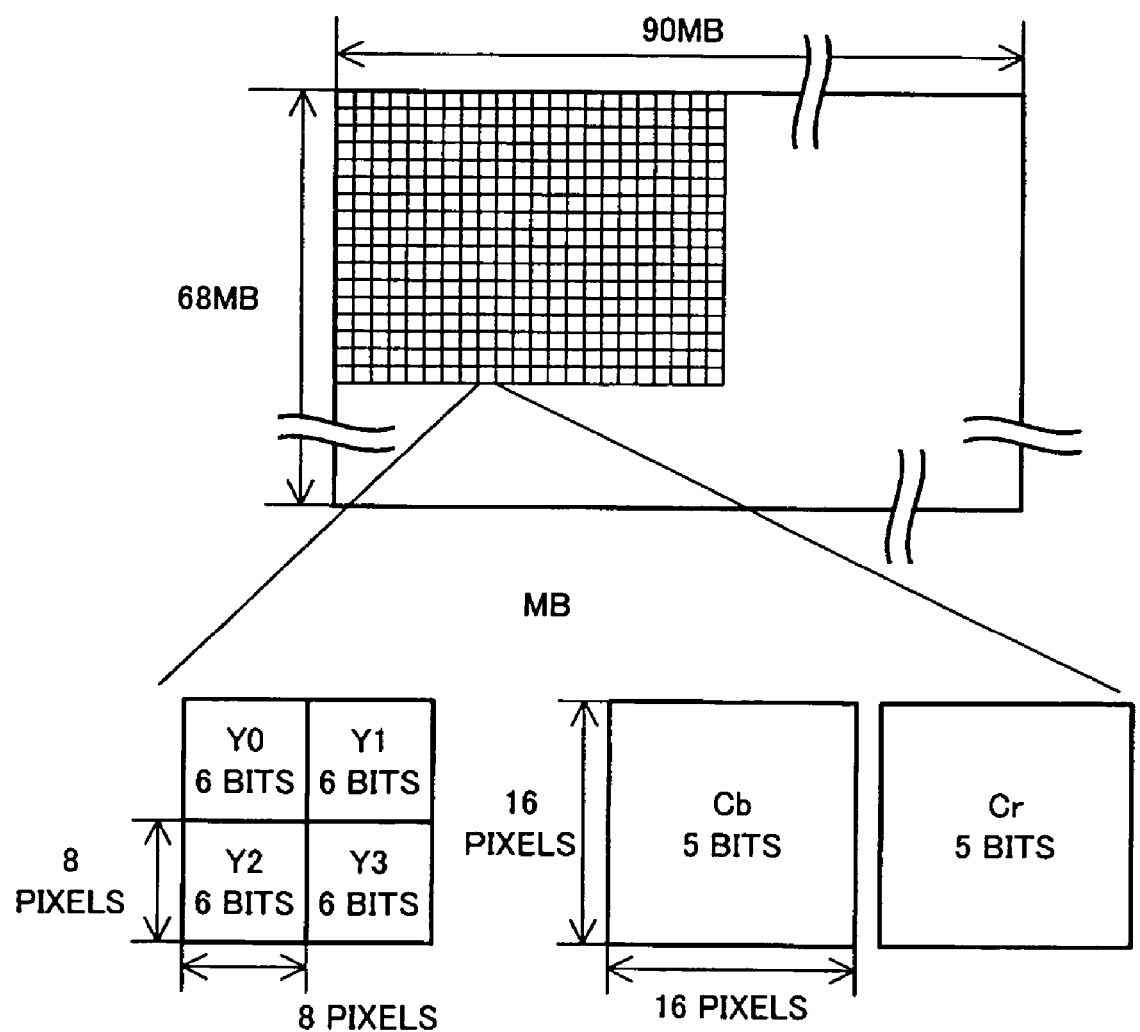
FIG. 3 is a schematic diagram describing search picture data.

FIG. 3 describes the structure of the time base of base data of search picture data of the 1080i/60 television system. The search picture data comprises base data and helper data. One frame is divided into for example 68 macro blocks×90 macro blocks. Each macro block comprises four DCT blocks of a luminance signal and two DCT blocks of color difference signals. One DCT block has a size of (8 pixels×8 pixels). These six DCT blocks are arranged at the same spatial position.

The search picture generating block 7 selects a DC component of for example Y0 from Y0, Y1, Y2, and Y3 having 6 bits each as coefficient data obtained from four DCT blocks of the luminance signal of the same macro block. A DC component of 6 bits is generated in such a manner that the low order 2 bits of 8 bits are cut off. DC components (Cb and Cr) of 5 bits each as coefficient data obtained from the color difference signals of the same macro block are generated in such a manner that the low order 3 bits of 8 bits are cut off.

When picture data of an I picture contained in one GOP is processed in such a manner, search picture data corresponding to each GOP can be generated. In the cut-off (truncating) process for the bit length of the color difference signals, since the low order 3 bits of 8 bits are cut off, colors of a light color picture disappear. According to the present invention, such a problem is solved by the following process.

The tape traveling speed in the search operation is higher than that in the recording operation. Thus, data is fragmentally reproduced from a plurality of tracks by the reproducing heads. Thus, when the search operation is performed at a predetermined higher speed than the normal reproduction operation, it is desired that reproduction search picture data be recorded at positions from which they are reproduced.

FIG. 4A shows a search operation at eight-times high speed. In FIG. 4A, vertical stripes represent tracks formed on the tape. An inclined arrow mark represents a path that the rotating head traces in the search operation. When the search operation is performed, for example only one of the two rotating heads is used. When the search operation is performed at eight-times high speed, the rotating head traces eight tracks of the tape at a time. The rotating head traces the tape at intervals of 16 tracks. The speed of the search operation is not limited to eight-times high speed. Alternatively, the speed of the search operation may be for example 24-times high speed. In addition, the user may be able to set one of a plurality of high speeds.

One error-correction code (ECC) unit comprises 16 tracks. An error is corrected every ECC unit. In the track pattern shown in FIG. 4A, No. 0 to No. 8 each represent one ECC unit. When the search operation is performed at eight-times high speed, the rotating head traces the tape at intervals of 16 tracks. Thus, when the phase that the rotating head traces is controlled, the rotating head traces a predetermined path in each ECC unit. When search picture data is recorded on the path, the search picture data can be securely reproduced.

Since main picture data cannot be recorded in a portion for search picture data, the data amount of the search picture data is small. When search picture data cannot be reproduced, it can be interpolated with main picture data adjacent thereto. Alternatively, an extra recording area may be formed in the recording format of the tape. Search picture data may be recorded in the extra recording area.

FIG. 4B shows a process for base data of the foregoing search picture data. The base data comprises a total of 16 bits of a DC component Y0 (6 bits) as a DCT block of the luminance signal and DC components Cb and Cr (5 bits each) as DCT blocks of the color difference signals of one macro block. Record data is recorded in the unit of a sync block (hereinafter abbreviated to as SB).

The number of macro blocks that are contained in one sync block is (720/16=45). When the search operation is performed, 34 sync blocks can be obtained every ECC block. The base data is recorded at predetermined positions of four successive ECC units. Thus, when the rotating head traces the tape four times, base data of (45 macro blocks×34 sync blocks×4=6120 macro blocks) can be obtained.

FIG. 4C describes helper data of search picture data. DC components Y1, Y2, and Y3 of 6 bits each (a total of 18 bits) as the remaining three DCT blocks other than the DCT block used as the base data is helper data. The number of macro blocks of the helper data contained in one sync block is (720/18=40). When the search operation is performed, 34 sync blocks can be obtained every ECC unit. The base data is recorded at predetermined positions of five successive ECC units. When the rotating head traces the tape five times, helper data of 45 macro blocks×34 sync blocks×5=6800 macro blocks can be obtained.

The search picture decoding block 16 of the reproduction side decodes search picture data with both the base data and helper data. Even if the helper data is lost, when the base data can be reproduced, a search picture having a low resolution can be obtained.

Figure 5:
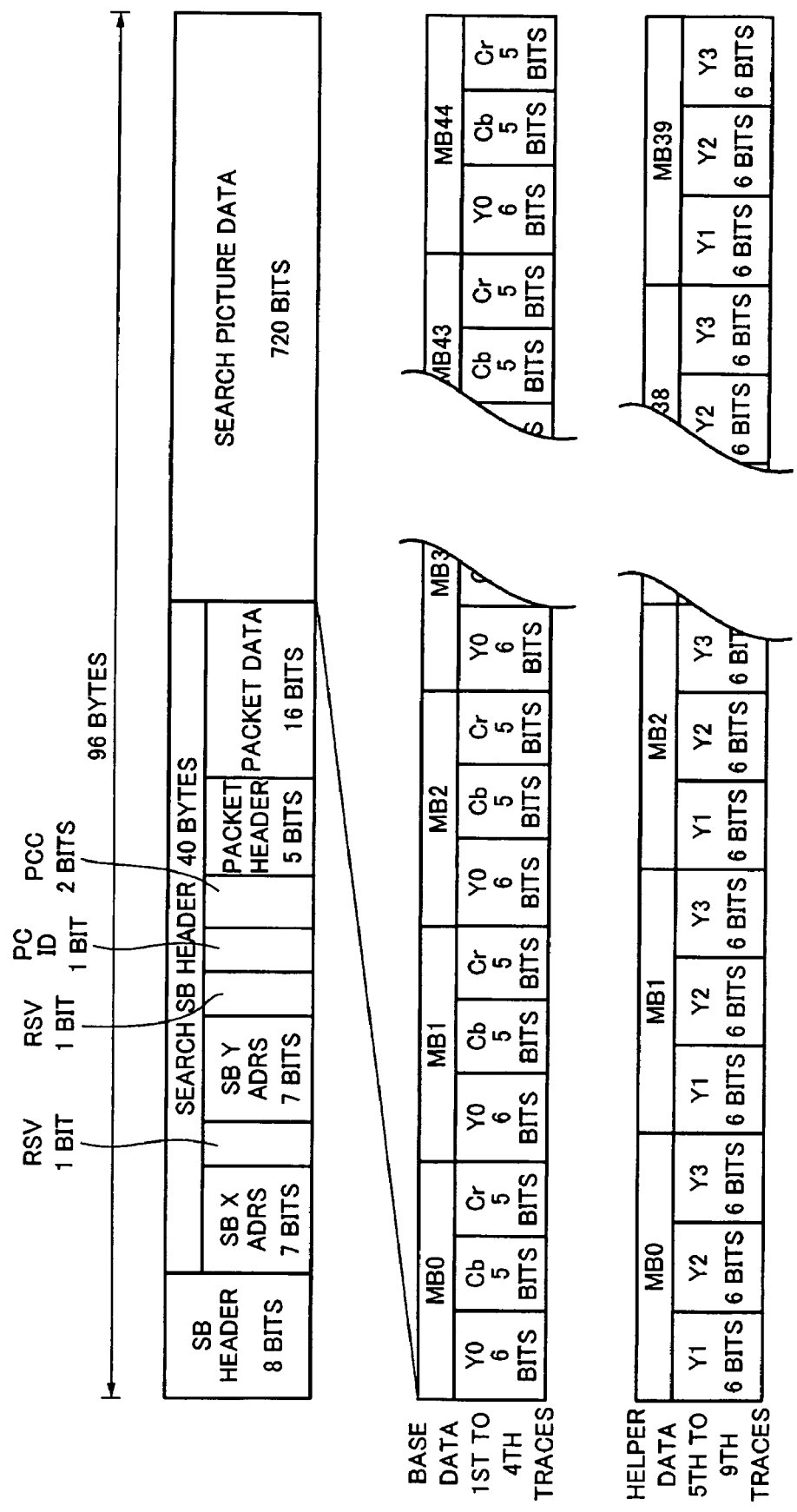
FIG. 5 is a schematic diagram showing an example of the data structure of a search sync block.

FIG. 5 shows an example of the data structure of a search sync block into which search picture data is inserted. In FIG. 5, a synchronous signal of 2 bytes, an ID of 3 bytes (the synchronous signal and the ID are placed at the beginning of a sync block), and an inner code parity of 10 bytes of an error correction code (the inner code parity is placed at the end of the sync block) are omitted. One sync block has a length of 111 bytes. Thus, FIG. 5 shows only 96 bytes of 111 bytes of one sync block without data of 15 bytes that are omitted.

An sync block header of 1 byte (8 bits) is placed at the beginning of 95 bytes. The sync block header is data that represent the contents of data of the sync block. The sync block header is followed by a search sync block header of 40 bits. The search sync block header is followed by search picture data of 720 bits. A sync block for regular video data does not have the search sync block header. Thus, the sync block can record main data of 760 bits.

As described above, search picture data has base data and helper data. One sync block can contain base data of 45 macro blocks. In FIG. 5, MB0 to MB44 represent macro blocks of base data. Each macro block contains a DC component Y0 (6 bits) of the luminance signal and DC components Cb and Cr (5 bits, each) of the color difference signals. On the other hand, one sync block SB can contain helper data of 40 macro blocks from MB0 to MB39. Each macro block contains DC components Y1, Y2, and Y3 (6 bits, each) other than a DC component Y0 of the luminance signal.

The search sync block header contains an address (horizontal x and vertical y) that represents the position of the sync block data in one picture of the search picture data, a packet header, packet data, and so forth. The packet header (5 bits) is information that represents the contents of the packet data (16 bits).

FIG. 6 shows contents of packet data corresponding to the values (0 to 31) of the packet header. When all 5 bits of the packet header are 0's and L/H is L, the packet data is a search header. In addition, the contents of the sub code are recorded as packet data. Values 16 to 31 of the packet data are currently reserved (undefined). In addition, in FIG. 5, Rsv represents undefined.

As will be described later, according to the embodiment of the present invention, a compensating process is performed for the color difference signals of search picture data (main data). Thus, when the reproduction processing side is informed of the contents of the compensating process, undefined packet data is used.

Figure 7:
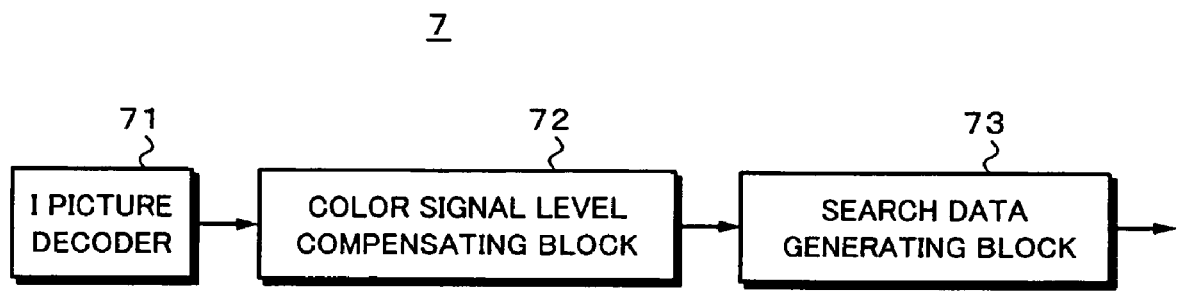
FIG. 7 is a block diagram showing an example of the structure of a search picture generating block.

FIG. 7 shows an example of the structure of the search picture generating block 7. An I picture decoder 71 extracts one I picture from for example one GOP of compressed data of the compressing block 2, decodes the extracted I picture, and generates one picture. However, as described above, since a search picture comprises only DC components, the I picture decoder 71 performs a process for extracting DC components from the luminance signal and the color difference components of a macro block of an I picture. Alternatively, the I picture decoder 71 may decode a base band picture, compensates a color signal, and then encode the compensated signal.

The color signal of the picture data that is output from the I picture decoder 71 is supplied to a color signal level compensating block 72. The color signal level compensating block 72 compensates two types of color difference data of the decoded picture and supplies the compensated color difference data to a search data generating block 73. The search data generating block 73 generates base data and helper data of search picture data in the foregoing method that has been prescribed in the standard.

The color signal level compensating block 72 prevents low level pixel data from becoming 0 and a search picture from becoming colorless when the bit length of color difference data is decreased. In other words, part or all the color signal of one frame is compensated so that the signal level increases.

Figure 8:
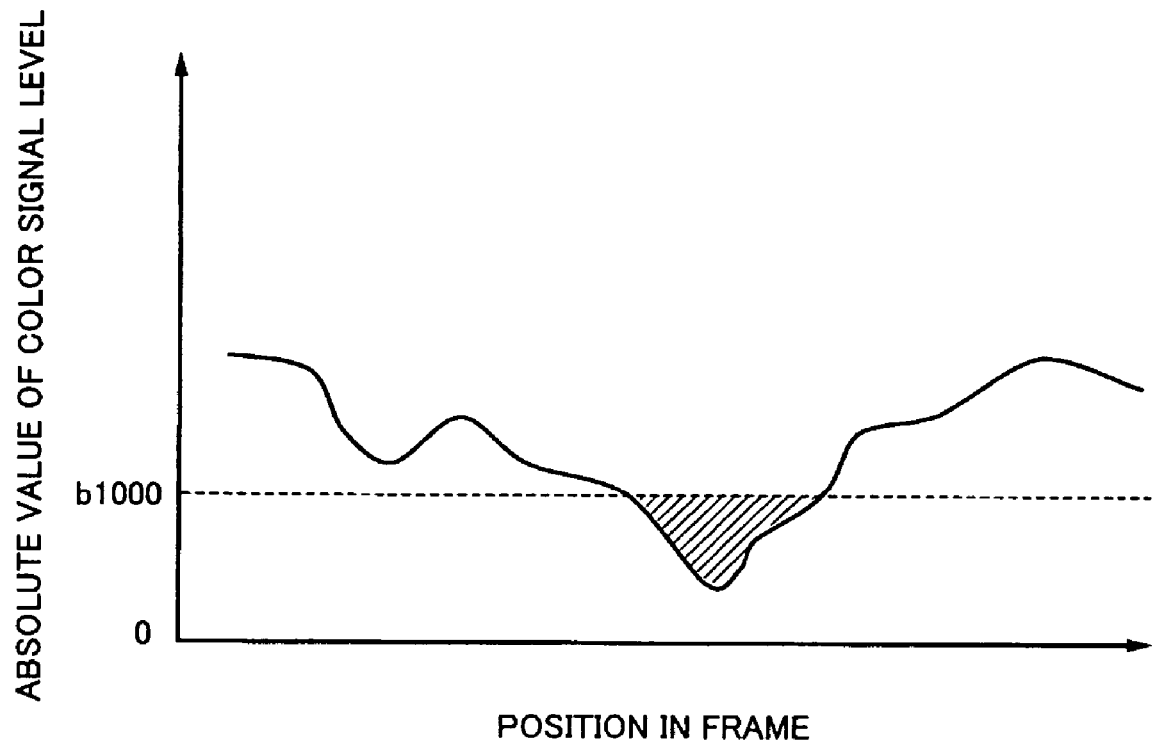
FIG. 8 is a schematic diagram showing a distribution of levels of a color signal for one frame.

When the low order 3 bits of the color signal are cut off and thereby converted into data of 5 bits, as shown in FIG. 8, a portion (hatched portion) having a level whose absolute value is smaller than b1000 (dotted line) is truncated to 0. When the original level is larger than b1000, colors are not lost. Otherwise, the color signal is truncated to 0 and becomes colorless. The real color signal data is 2's complement with a sign. However, for simplicity, in the following description, it is assumed that the process for increasing the value of data and the level is performed for data represented with an absolute value (7 bits) excluding MSB (sign bit).

Figure 9:
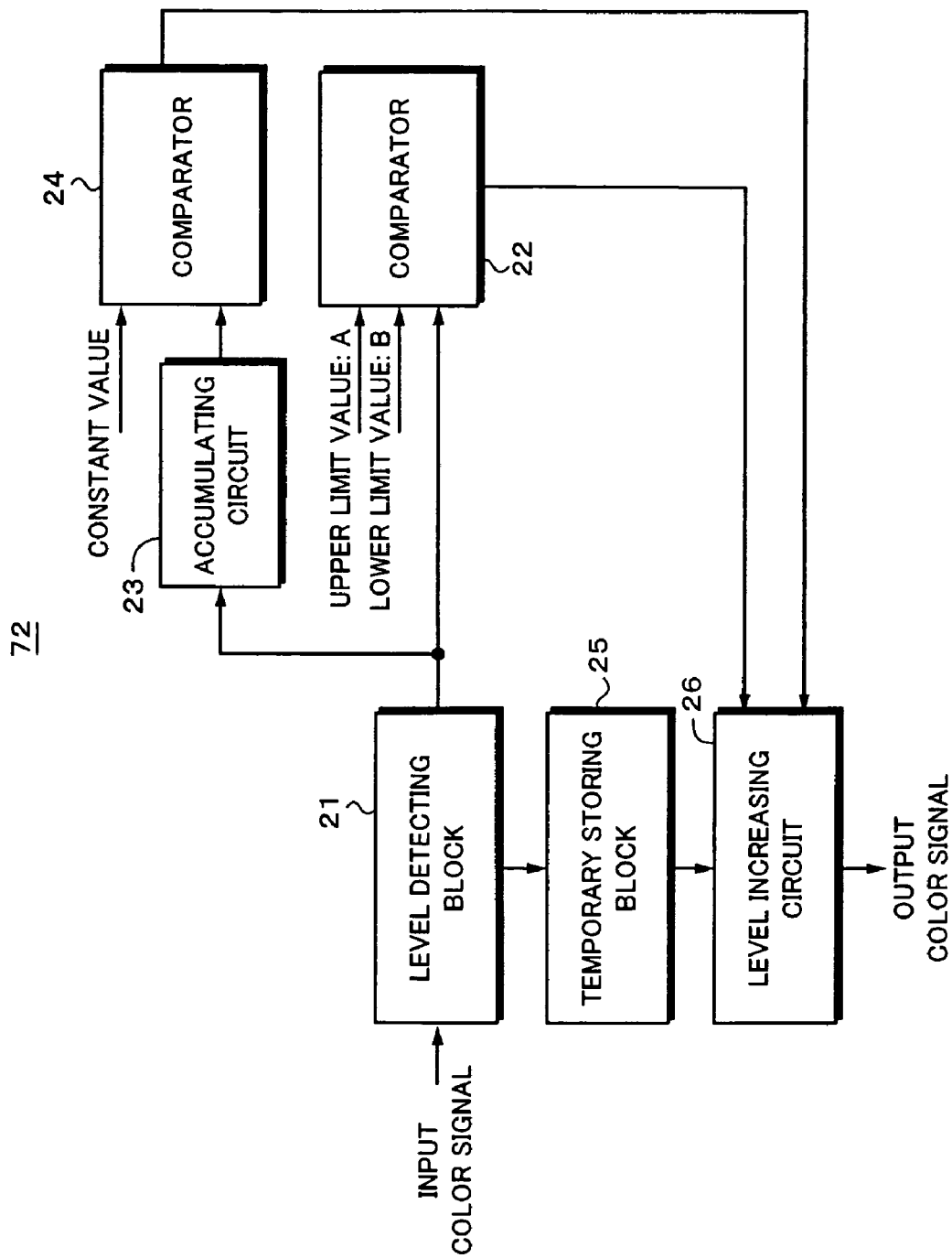
FIG. 9 is a block diagram showing an example of the structure of a color signal level compensating block.

FIG. 9 shows an example of the structure of the color signal level compensating block 72. In FIG. 9, reference numeral 21 represents a level detecting block that detects the level of the color signal received from the I picture decoder 71 (namely, the levels of DC components separated from DCT blocks of the color difference signals of each macro block). In the structure shown in FIG. 9, two level detecting blocks are disposed for the two color difference signals. Of course, one level detecting block 21 may be disposed. In this case, the level detecting block 21 timesharingly performs the level detecting process for the two color difference signals.

The level detecting block 21 detects the level of the color signal. The detected level is supplied to a comparator 22 and an accumulating circuit 23. An input color signal is temporarily stored in a temporary storing block 25. On the output side of the temporary storing block 25, a level increasing circuit 26 is disposed. The level increasing circuit 26 obtains a color signal having an increased level. The amount of the increased level by the level increasing circuit 26 is controlled in accordance with comparison information obtained by comparators 22 and 24. Output data of the level increasing circuit 26 is supplied to a search data generator 73 that generates search data. The search data generating block 73 performs a cut-off process for the low order 3 bits of the color signal data so as to convert the color signal data from 8 bits into 5 bits.

An upper limit value A and a lower limit value B are input to the comparator 22. A constant value is supplied to the comparator 24. The comparator 24 compares the output of the accumulating circuit 23 with the constant value. The color signal level compensating block 72 compensates the color signal level in accordance with one of the following methods so that the level of the color signal increases.

In a first compensating method, only data that is smaller than the threshold value b1000 is replaced with b1000. The upper limit value A that is input to the comparator 22 is b1000. When the detected level X of the comparator 22 is smaller than b1000 (namely, X<A (=b1000)), the level increasing circuit 26 replaces the level of the color signal having the relation of X<A with b1000 in accordance with the comparison information. The level increasing process prevents the level of the color signal data from being truncated to 0. In the first compensating method, the lower limit value B, the accumulating circuit 23, the comparator 24, and the temporary storing block 25 are not used.

In a second compensating method, only data whose detected level is smaller than the threshold value A (=b1000) and larger than the threshold value B is replaced with b1000. The comparator 22 compares not only the upper limit value A, but the lower limit value B with the detected level X. The level increasing circuit 26 replaces the level of the color signal having the relation of B<X<A with b1000 in accordance with the comparison information. It is preferred that the upper limit value A be fixed to b1000 and the lower limit value B be able to be set by for example an EEPROM. In this case, the lower limit value B can be set to a suitable value in accordance with for example an evaluated result of a picture pattern. In the second compensating method, the accumulating circuit 23, the comparator 24, and the temporary storing block 25 are not used.

In a third compensating method, a constant value for example b111 is added to all color signal data so as to increase the level of the color signal. In the third compensating method, the level increasing circuit 26 uniformly increases the level of the input color signal without the processes of the level detecting block 21 and the temporary storing block 25. In addition, the processes of the comparator 22 and the comparator 24 are not required. The constant value b111 is only an example. The constant value is not limited to b111.

In a fourth compensating method, a constant value for example b111 is added to data having a level smaller than a threshold value for example b100. The comparator 22 compares the level X detected by the level detecting block 21 with the upper limit value A for example b1000. The level increasing circuit 26 performs a process for adding a constant value to only data having the relation of X<A. The threshold value b111 is just an example. The threshold value is not limited to b111. In the fourth compensating method, the level detecting block 21, the comparator 22, the accumulating circuit 23, the comparator 24, and the temporary storing block 25 are not used.

In a fifth compensating method, the minimum level Xmin of the color signal in a predetermined range is detected. Only when the minimum detected level is smaller than a threshold value A for example b1000 (Xmin.<A), the difference (A−Xmin.) between the threshold value A and the minimum detection level is added to all the color signal in the predetermined range. The predetermined range is for example one frame.

To detect the minimum level Xmin. of one frame, the comparator 22 successively compares the levels of the two color signals of one frame that are successively input, selects data having a smaller level in accordance with the comparison result, and compares the minimum level of the data that has been selected with the level of the next color signal. After the color signals have been compared for one frame period, the minimum level Xmin. for one frame is obtained.

After the minimum level Xmin. for one frame has been obtained, the comparator 22 compares the minimum level Xmin. with the threshold value A (=b1000). When the minimum level Xmin. is smaller than the threshold value A, the difference (A−Xmin.) between the threshold value A and the minimum level Xmin. is obtained and information of the difference is supplied to the level increasing circuit 26. The level increasing circuit 26 adds the difference value to all the color signal in one frame stored in the temporary storing block 25 until the level increasing circuit 26 can detect the minimum level. This process compensates all the color signal data for one frame so that the color signal data has a level equal to or larger than A. In the fifth compensating method, the accumulating circuit 23 and the comparator 24 are not used.

In a sixth compensating method, an average level Xavr. of the color signal in a predetermined range for example one frame is detected. Only when the detected average level Xavr. is smaller than a threshold value, a value is added to all color signal data in the predetermined range so as to increase the level of the color signal. The accumulating circuit 23 accumulates the values of the color signal for one frame. The accumulated value corresponds to the average level Xavr. The accumulated value may be divided by the number of pixels so as to obtain the average level.

The average level Xavr. obtained by the accumulating circuit 23 is supplied to the comparator 24. The comparator 24 compares the average level Xavr. with a constant value (threshold value). The constant value is for example a value close to b1000. When the detected result represents that the average level Xavr. is smaller than the constant value, comparison information is supplied to the level increasing circuit 26. The level increasing circuit 26 adds the constant value to all the color signal for one frame stored in the temporary storing block 25 until the level increasing circuit 26 can detect the average level. It is preferred that at least one of the constant value of the comparator 24 and the constant value added by the level increasing circuit 26 be variable. In the sixth compensating method, the comparator 22 is not used.

In the foregoing first to sixth compensating methods, when the recording operation is performed, the level of the color signal is increased. When the search reproducing operation is performed, since a search picture can be a coarse picture, it is not necessary to reversely compensate the level of the color signal. Simply, low order 3 bits (all 0's as an absolute value) need to be added to 5 bits. However, when a search picture needs to have the quality of a record picture (main picture), the reproduction side needs to perform a process for reversely compensating the level of the color signal.

Information that causes the reproduction side to decrease the level of the color signal is recorded onto the tape. For example, as described in FIG. 5, information as undefined packet data of a sync block of a search picture is recorded onto the tape. When a plurality of compensating methods are used, information that represents the compensating methods and information that represents the amount of increase of the level of the color signal are recorded as packet data. A packet header that represents that information about compensation of the color signal is newly defined.

In the structure on the reproduction side shown in FIG. 1, the data separating block 13 separates data into a packet header and packet data. The data separating block 13 supplies search data information necessary for decoding the level of the color signal to the search picture decoding block 16. With the search data information, the color signal of 8 bits that is as close to the original value as possible can be decoded.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. According to the present invention, for example, the recording process, reproducing process, search picture data generating and restoring process, and so forth may be performed by either or both hardware and software. In addition, the present invention can be applied to the case that a recording medium such as an optical tape or an optical disc is used instead of a magnetic tape.

What is claimed is:

1. An information signal recording apparatus for compression-encoding video data and recording the compression-encoded video data onto a recording medium, the information signal recording apparatus comprising:

a search picture generating block configured to decrease the bit length of a component of a luminance signal and the bit length of a component of a color signal of an intra-coded data of the compression-encoded video data so as to generate search picture data;

a color signal compensating block configured to compensate the component of the color signal processed by the search picture generating block so as to increase the level of the component of the color signal; and a recording medium configured to dispersedly record the search picture data generated by the search picture generating block onto the recording block.

2. The information signal recording apparatus as set forth in claim 1, wherein the color signal compensating block performs a process for replacing only the color signal having a smaller level than a threshold value with the threshold value itself.

3. The information signal recording apparatus as set forth in claim 1, wherein the color signal compensating block performs a process for replacing only data of the color signal having a smaller level than a first value and larger than a second value with the first value itself.

4. The information signal recording apparatus as set forth in claim 1, wherein the color signal compensating block adds a constant value to all data of the color signal so as to increase the level of the color signal.

5. The information signal recording apparatus as set forth in claim 1, wherein the color signal compensating block performs a process for adding a constant value to only data having a smaller level than a threshold value so as to increase the level of the color signal.

6. The information signal recording apparatus as set forth in claim 1, wherein the color signal compensating block performs a process for detecting the minimum level of the color signal in a predetermined range and adding the difference between the threshold value and the minimum level to all the color signal in the predetermined range, so as to increase the level of the color signal, only when the detected minimum level is smaller than the threshold value.

7. The information signal recording apparatus as set forth in claim 1, wherein the color signal compensating block detects an average level of the color signal in a predetermined range and adds a predetermined value to all data of the color signal in the predetermined range only when the detected average level is smaller than a threshold value so as to increase the level of the color signal.

8. The information signal recording apparatus as set forth in claim 1, wherein the color signal compensating block records information that represents the amount of increase.

9. The information signal recording apparatus as set forth in claim 1, wherein information that represents the amount of increase of the level increased by the color signal compensating block and information that represents a compensating method of the color signal compensating block are recorded.

* * * * *